April 13, 1926.

H. W. JOY 1,580,204

ATTACHMENT FOR MOTION PICTURE PROJECTING APPARATUS

Filed Feb. 5, 1924      6 Sheets-Sheet 1

Henry W. Joy
Inventor
By his Attorney

April 13, 1926.  
H. W. JOY  
1,580,204  
ATTACHMENT FOR MOTION PICTURE PROJECTING APPARATUS  
Filed Feb. 5, 1924  
6 Sheets-Sheet 2

Fig. 2.

Henry W. Joy  
Inventor  
By his Attorney

April 13, 1926.
H. W. JOY
1,580,204
ATTACHMENT FOR MOTION PICTURE PROJECTING APPARATUS
Filed Feb. 5, 1924   6 Sheets—Sheet 3
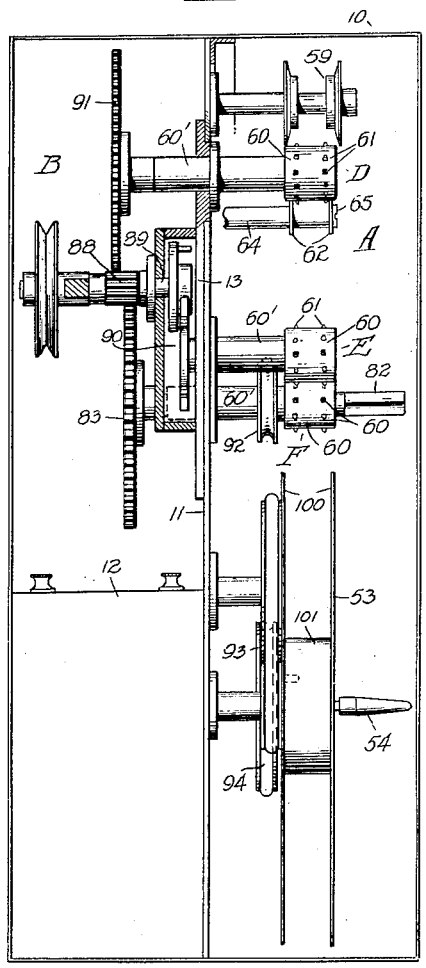
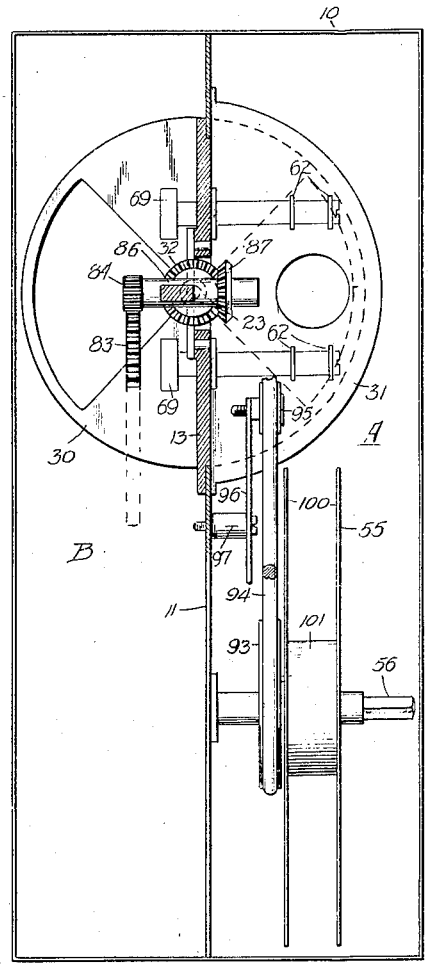
Henry W. Joy
Inventor
By his Attorney April 13, 1926.   1,580,204
H. W. JOY
ATTACHMENT FOR MOTION PICTURE PROJECTING APPARATUS
Filed Feb. 5, 1924   6 Sheets-Sheet 4

Henry W. Joy
Inventor

By his Attorney

April 13, 1926.
H. W. JOY
1,580,204
ATTACHMENT FOR MOTION PICTURE PROJECTING APPARATUS
Filed Feb. 5, 1924  6 Sheets-Sheet 5
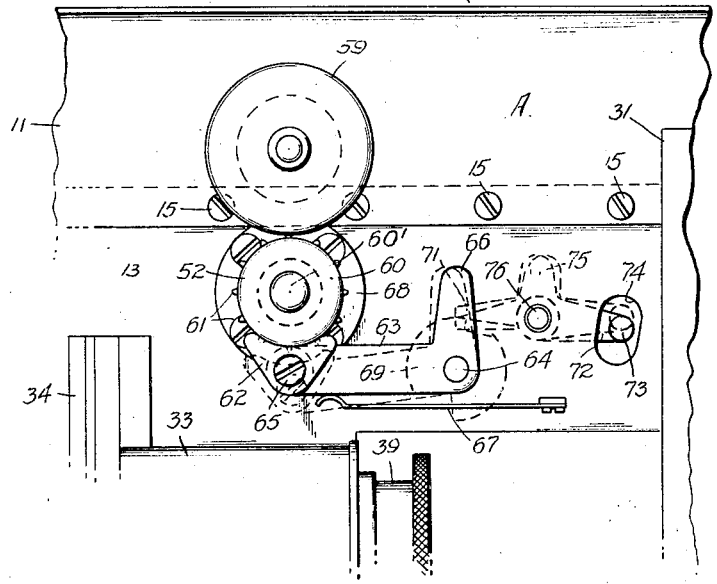
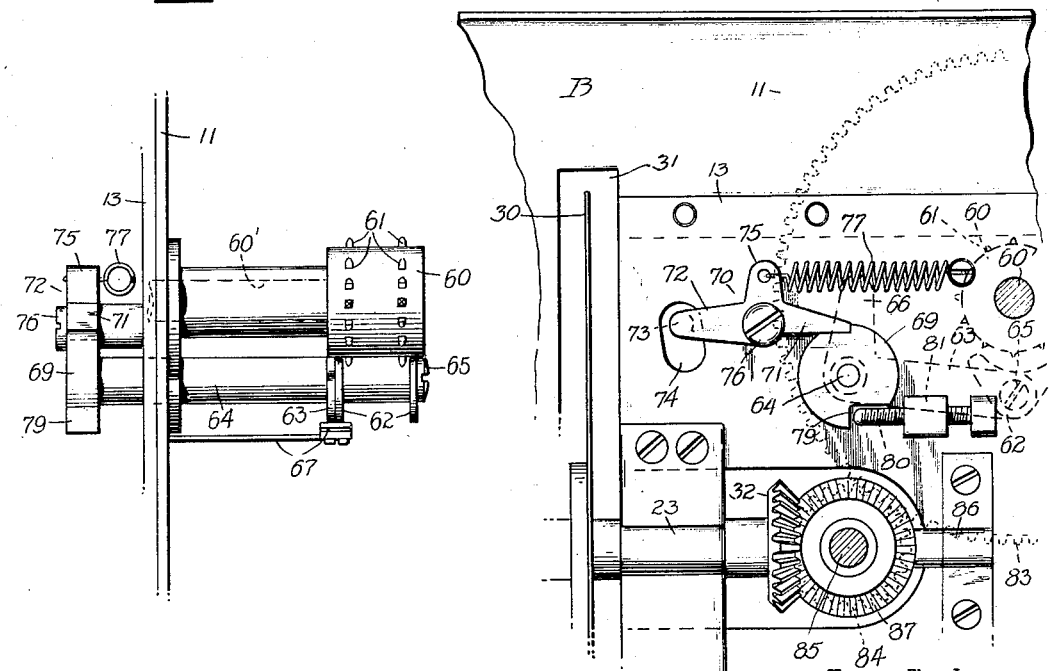
Henry W. Joy
INVENTOR
BY
his ATTORNEY April 13, 1926.  
H. W. JOY  
1,580,204  
ATTACHMENT FOR MOTION PICTURE PROJECTING APPARATUS  
Filed Feb. 5, 1924  6 Sheets-Sheet 6
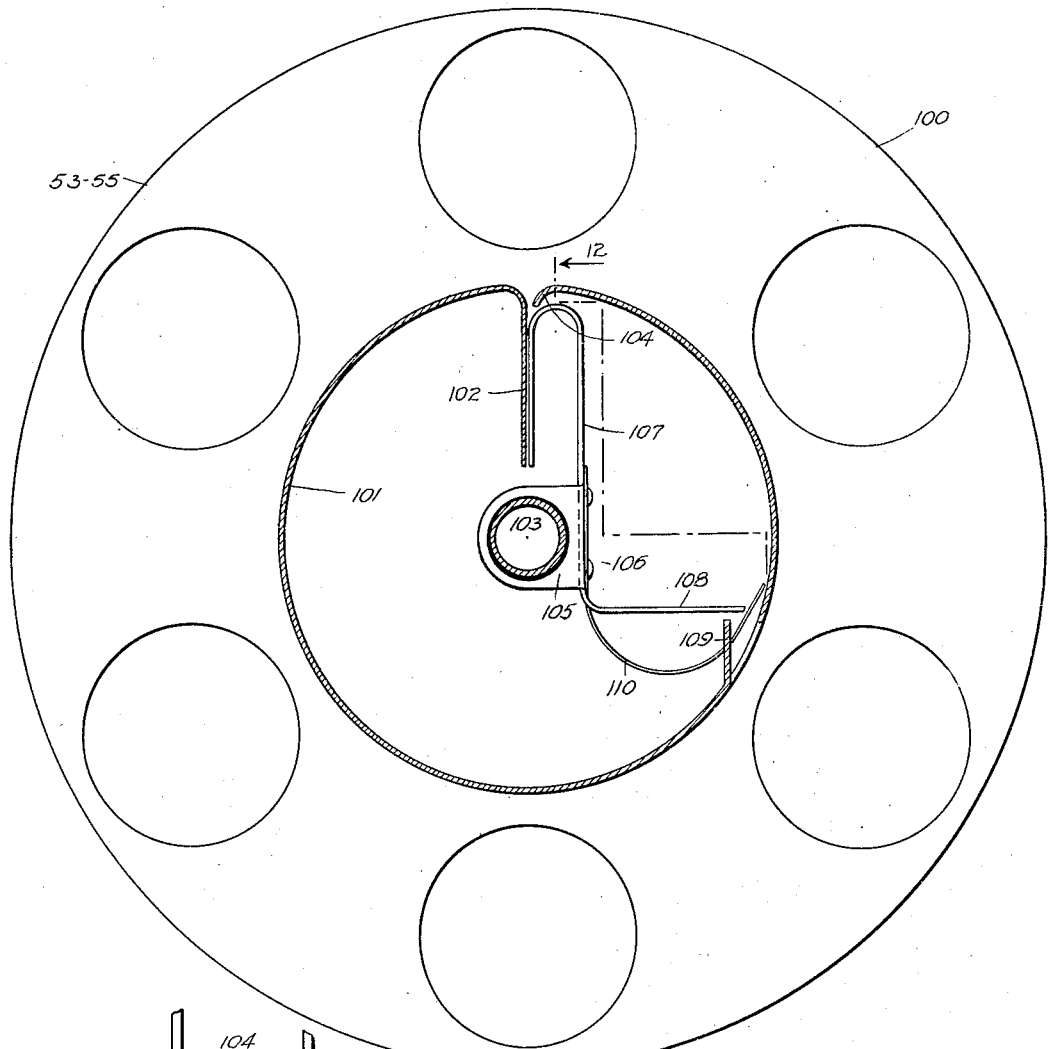
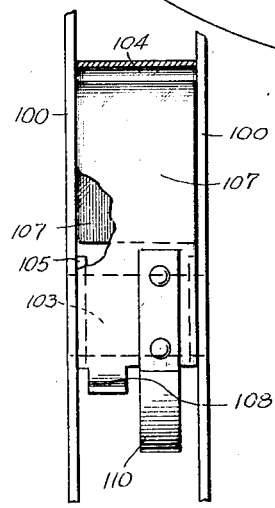
Henry W. Joy  
Inventor Patented Apr. 13, 1926.

1,580,204

UNITED STATES PATENT OFFICE.

HENRY W. JOY, OF CRUGERS ON HUDSON, NEW YORK.

ATTACHMENT FOR MOTION-PICTURE-PROJECTING APPARATUS.

Application filed February 5, 1924. Serial No. 690,706.

*To all whom it may concern:*

Be it known that I, HENRY W. JOY, a subject of the King of Great Britain, residing at Crugers on Hudson, county of Westchester, and State of New York, have invented new and useful Improvements in Attachments for Motion-Picture-Projecting Apparatus, of which the following is a specification.

My invention relates generally to portable motion picture projecting apparatus, and has specific reference to certain improvements in the construction and arrangement of various attachments relating thereto.

The purpose of the present invention is to provide a complete portable motion picture projecting unit which is particularly adapted for home use.

The principal objects of my invention are, first, to provide a mechanically operated make and brake electrical connection for controlling the current supplying the source of light as applied to the moving film; second, to afford facilities for adjusting the focusing lenses used in connection with devices of this character; third, to provide means in connection with the film guide sprockets whereby the operation of threading and placing of the film thereon is greatly facilitated; and fourth, to provide a film reel with means for receiving, holding and automatically releasing the end of a film.

Figure 1:
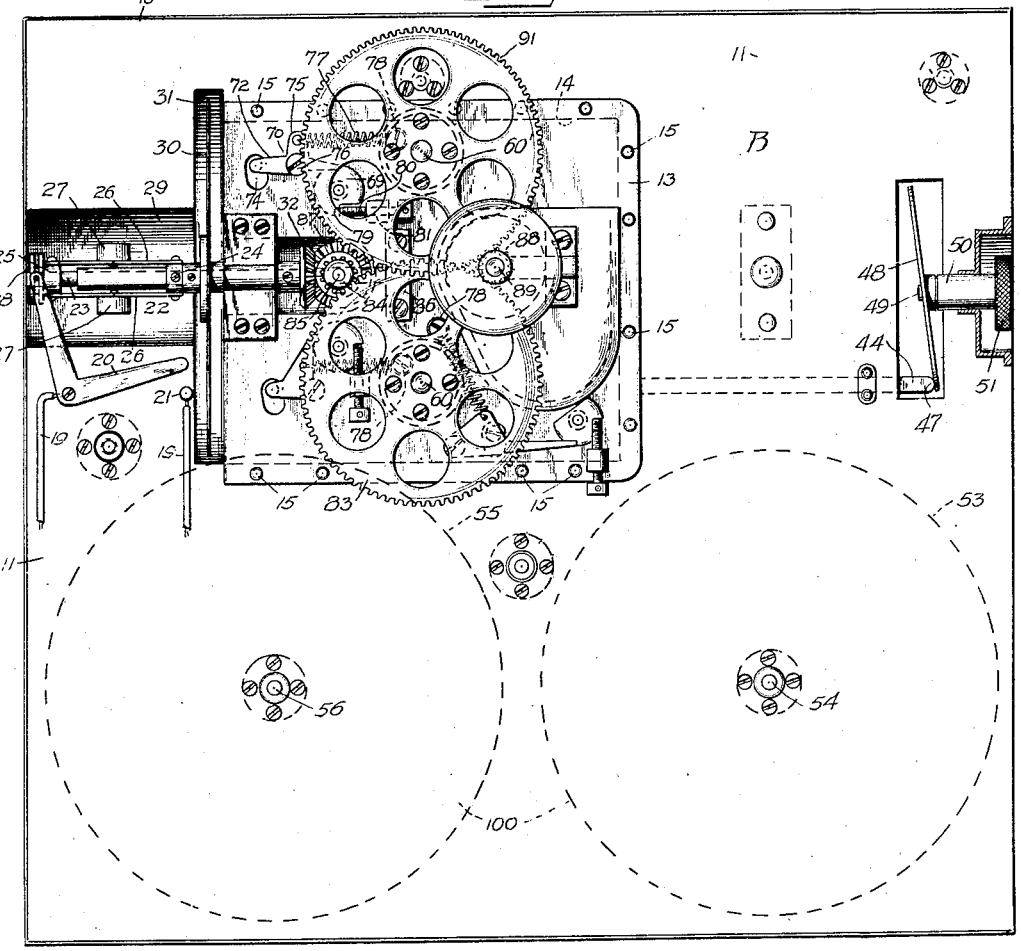
Figure 6:
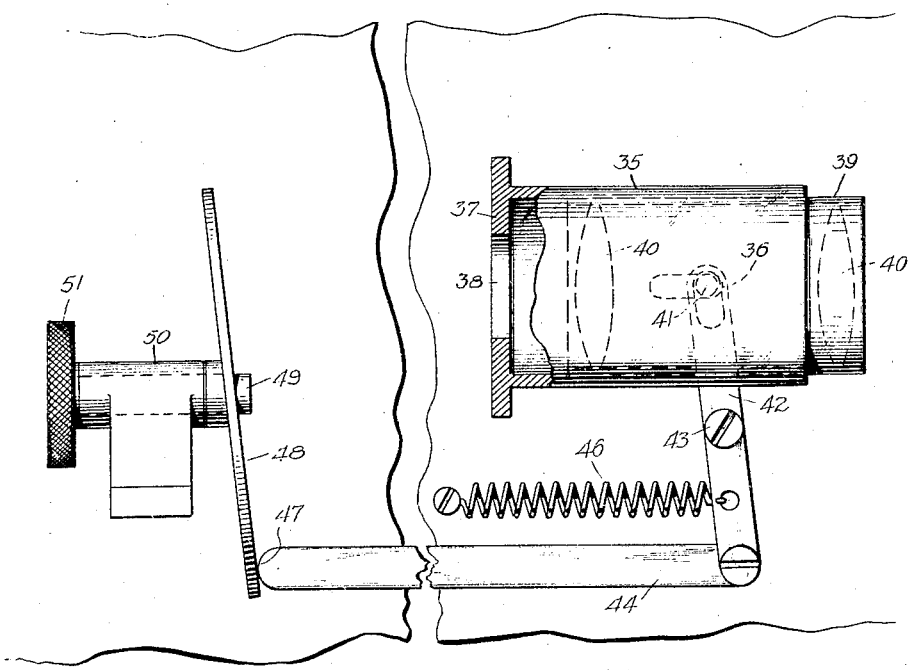
Figure 7:
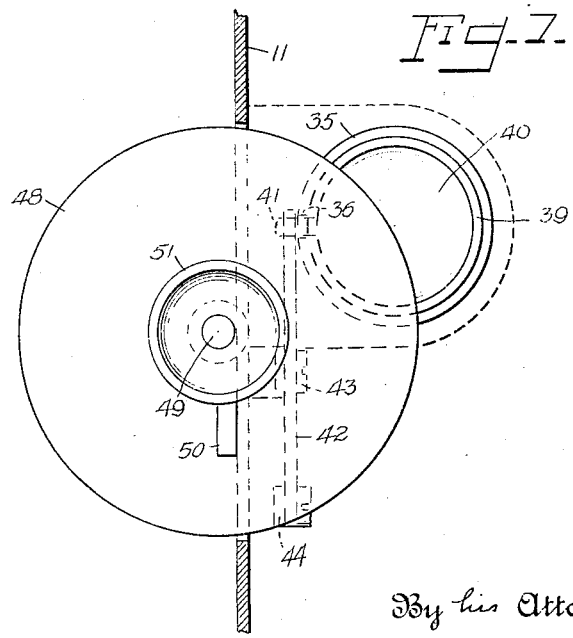

I attain the above mentioned objects by means of the construction hereinafter described and illustratively exemplified in the accompanying drawings, in which, Fig. 1 is a side elevational view of my improved motion picture projecting apparatus showing the side wall of the housing or casing removed to disclose the operating mechanism contained therein; Fig. 2 is a similar view of the reverse side of the complete device; Fig. 3 is a transverse sectional view taken on the lines 3—3 of Fig. 2; Fig. 4 is a transverse sectional view taken on the lines 4—4 of Fig. 2; Fig. 5 is an enlarged detail view of the make and brake arrangement for controlling the lighting circuit; Fig. 6 is a side elevational view of the improved focusing mechanism; and Fig. 7 is a front elevational view of the same; Fig. 8 is a side elevational view of the film sprocket equipped with the pad releasing and locking means, Fig. 9 is a similar view of the reverse side of the locking means; and Fig. 10 is a sectional view through the partition and showing an end view of the releasing and locking means; Fig. 11 is a transverse sectional view taken through a film reel and showing my improved film holding and releasing means. Fig. 12 is a detail view of the film gripping means as applied to the core of the reel.

Referring to the drawings and particularly to Figs. 1 to 4, inclusive, 10 designates a rectangular housing or casing composed preferably of sheet metal and having suitable openings to accommodate the exposed portion of the motion picture projecting mechanism. Disposed longitudinally of the casing is a full partition plate 11 upon which the moving parts are supported. The compartment indicated A on one side of the partition 11 contains mechanism for handling the film and the other compartment B is adapted to contain parts of the power transmitting mechanism and the batteries 12 from which the lighting circuit may receive its current.

The projector proper, as previously stated, is carried by the partition 11 and comprises the film operating mechanism disposed in the compartment A. The mechanism just referred to is secured to a plate 13, which is arranged over an opening 14 located adjacent the upper elevation of the partition, and which is secured to the latter by a plurality of screws 15, shown particularly in Figs. 1 and 2.

Mounted on the partition 11 and disposed rearwardly of the plate 13 is a lamp housing 16 having the usual condenser lens 17 at the forward end and a high powered electrically lighted lamp 18 supported on its rear wall, the supply wires 19 of the lamp being arranged in a circuit leading to the batteries 12. This circuit is diagrammatically illustrated in Fig. 5 and contains a mechanically operated make and break arrangement consisting of a pivotally mounted bell crank lever switch 20 one arm of which is adapted to be moved into contact with a terminal 21 to complete a circuit subsequently to the film having attained a predetermined rate of travel through the projector. According to this invention the terminal 21 is connected to one wire leading to the batteries 12 and a second wire connects the batteries with terminal of the lamp 18, the other lamp terminal being connected through a third wire to the pivotal point of the bell lever switch 20, which is constructed of metal and conducts the current to the terminal 20 with which it contacts when closed. The switch 20 is controlled by its connection with a governor 22 in such a way that when the device is at rest or being operated at a very reduced rate of speed the contact is broken and the stationary or slowly moving film is not subjected to the condensed light rays of the lamp 18, but instantly the film attains its proper speed the governor opens and the circuit is closed.

The governor 22 is mounted on the cut-off shutter shaft 23 at the back of the machine and comprises the usual spaced hubs 24 and 25 the latter of which is slidably mounted on the shaft 23. A plurality of axially arranged springs 26 are connected at their opposite ends to the hubs 24 and 25, respectively, and the centrifugal force of the balls 27 revolving with the shaft or central spindle 23 throws out the springs 26 to which they are attached, shortens their length on the spindle or shaft 23 and lifts a grooved collar 28 that carries the upright arm of the bell lever switch 20.

It is customary in the operation of ordinary motion picture projecting apparatus for the operator to turn on the light before setting the film in motion and to stop the movement of the film subsequently to turning off the light. This may result in serious damage because of the inherent inflammable nature of the film, and where batteries are used the loss of current is considerable. A safety shutter has been incorporated in the structure of many types of projectors to avoid possible ignition of the film, but in accordance with the present construction such a safety shutter becomes unnecessary due to the movement of the switch to close or open the circuit as the rate of movement of the film increases or decreases. It is contemplated that in large machines employing high tension lighting systems it may become necessary to substitute a quick acting switch instead of the specific type referred to in the foregoing description.

For convenience, the make and break switch control is arranged at the front of the machine and the governor proper is enclosed in a housing 29 attached to the partition 11. The shaft 25 projects rearwardly through the housing 29 to receive a cut-off shutter 30, the latter being encased over one half its area by a curved box 31 disposed in the compartment A, the other half projecting into the compartment B, as clearly illustrated in Figs. 1 and 2. The plate 13 previously referred to is located between the cut-off shutter 30 and the lamp housing 16, and the inner end of the shaft 25 projects over the forward portion of the plate to receive a lever gear 32 for transmitting power to the shutter and governor.

Attached to the plate 13, centrally thereof, and in coaxial alinement with the axes of the condenser lens 17 and openings in the cut-off shutter 30, is the focusing lens 33 which may be mounted in any well known manner, including a framing device 34 to receive and guide the film. According to the present construction of the focusing lens 33, the well known rack and pinion control for adjusting the lens is replaced by a device which overcomes any objectional features associated with the usual arrangement and enables the focusing to be effected at any convenient location on the machine.

The focusing lens and device 33 comprises an outer cylinder or mount 35 having a longitudinal slot 36 in the side thereof and a closed end wall 37 provided with an opening 38 to admit the light rays after passing through the film. Slidably mounted in the bore of the cylinder 35 is a lens jacket 39, in which the projecting lens members 40 are disposed, and which is provided with a pin 41 adapted to project through the slot 36 to receive an operating mechanism, comprising a straight lever 42 pivotally mounted centrally thereof about a pivot screw 43 carried by the plate 13. The upper end of the lever 42 is provided with a longitudinal slot to loosely embrace the outer end of the pin 41, and the lower end is pivotally connected to a laterally arranged slide rod 44 for transmitting movement to the lens jacket 39. The rod 44 in the present instance projects towards the rear of the machine and is guided adjacent the free end between suitable guide screws 45. The rod 44 is normally drawn rearwardly by means of a helical spring 46, one end of which is attached to the lower portion of the lever 42 below the pivot 43, while the opposite end is fixed to the plate 13. The free end of the rod 44 is provided with a round nose portion 47 which is yieldably held in contact with the marginal portion of an oblique disc 48. The disc revolves about an axis parallel to the rod 44, and is fixed at an angle upon a shaft 49 supported in a bearing bracket 50, said shaft 49 being provided with a knurled thumb nut 51 fixed to the end projecting beyond the bracket.

In operation, it will be clear that rotary movement of the thumb nut 51 will revolve the disc 48 thereby imparting a rectilinear motion to the rod 44, which in turn rocks the lever 42 and causes the lens jacket 39 to longitudinally adjust itself with respect to cylinder 35. With this arrangement the focusing control nut 51 may be disposed in any convenient place in the machine and the movement imparted therefrom to the lens jacket 39 will be a very smooth motion which enables the operator to make both fine and coarse adjustment in a comparatively short space of time. A still further advantage associated with the use of the oblique disc motion resolves itself into an operation which permits a complete rotation of the thumb control head 51, consequently avoiding the usual limited movement or "dead cuts" to the turning of the head 51.

Referring now particularly to the film operating device shown in Figs. 1 to 4 and 8 to 10, inclusive, wherein the film designated C is threaded over a series of toothed drums or sprockets 52, all of which are substantially the same design, the only difference being in their respective mountings. The film C is originally placed in the projector wound on a reel 53, which is loosely mounted on a fixed spindle 54 carried by the partition 11 and projected into the compartment A. The reel 53 is disposed at the rear of the compartment, while a second take up reel 55 is similarly mounted at the forward part of the compartment and is supported on a fixed spindle 56, also attached to the partition 11. The spindles 54 and 56 are so spaced apart that the adjacent edges of their respective reels are in close proximity to each other thus utilizing a minimum amount of space. The film C unwinding from the reel 53 is taken from the rear thereof so that the rotation of the latter is in a clockwise direction. From the reel 53 the film passes upwardly and over two idler guide rolls 57 and 58 arranged respectively above and below the elevation of the lamp housing 16; then in a lateral forward path to a third similarly mounted idler guide roll 59; and thereafter in a downward course over the driven sprocket drums 52 and between the sections of the framing device 34 to the take up reel 55.

The first sprocket drum device designated D, is located directly beneath the roll 59 and comprises a cylindrical member 60 fixed to a spindle 60' and having a series of teeth 61 disposed about the periphery adjacent both ends to receive and engage the side perforations in the film C. In order to maintain a constant alinement of the film C with respect to the drum 60, a guide or pressure pad 62 is brought to bear against the marginal surface of the cylinder 60 outside the teeth 61, as shown in Fig. 10. To insert a length of film it is of course necessary to first remove the pad 62, and since the latter is clamped about the sprocket drum, it follows that considerable difficulty is experienced in resetting the film. According to the present invention the pads or shoes 62 may be readily removed and locked so as to remove all obstruction adjacent the cylinder member 60.

Referring especially to Figs. 8, 9 and 10, the pads 62 are provided with a locking device which comprises a lever 63 fixed on a spindle 64 projecting through the plate 13. The end of the lever 63 carries a pivot screw 65 upon which is loosely mounted the pads or shoes 62, the latter comprising a pair of parallel triangular pieces having one side curved to conform to the general curved surface of the cylinder member 60. The lever 63 is further provided with an upright arm 66, disposed over the pivotal center, the arm 66 being the usual pad arm for releasing the pad from the cylinder. The free end of a flat spring 67 holds the pads 62 in yieldable engagement with the surface of the cylinder sprocket 60 by exerting pressure against the under edge of the lever 63 adjacent the pads.

The spindle 64 is supported in a bearing 68 in the plate 13 and projects therethrough and into the compartment B. A single tooth ratchet 69 is fixed to the end of the spindle 64. The tooth of the ratchet 69 is adapted to be engaged by a locking pawl 70 comprising a pivoted inverted T shaped lever having one arm 71 movable in the path of the ratchet tooth; a second arm 72 provided with a button 73 which is disposed in an arcuate slot 74 in the plate 13 and projects slightly into the A compartment; and a third upright arm 75 disposed over the pivot screw 76, which is located substantially midway of the length of the arms 71 and 72, the third arm 74 being adapted to receive one end of a helical spring 77, the opposite end thereof being fixed to a screw pin 78 in the face of the plate 13.

If it is found desirable to limit the position of the pads 62 with respect to the surface of the cylinder sprocket 60, i. e. to provide a stop which will prevent the pads from becoming too widely separated from the cylinder sprocket 60, the ratchet 69 is further provided with a scond tooth 79 which is arranged diametrically opposite to the first tooth and is disposed to move into engagement with an adjustable stop screw 80. The screw 80 is mounted in the threaded bore of a boss 81 projecting from the surface of the plate 13.

As stated briefly in the foregoing paragraph, the guide mechanism for the film is generally clamped about the cylinder sprocket 60 and in order to afford ease of manipulation of any motion picture or similar device handling perforated film upon toothed sprockets, it has been found desirable to incorporate some means in the general structure to permit easy removal, rigid locking and rapid replacement of the pressure pads 62. Ordinarily the practice has been to hold the pads open against the continuous tension of the spring 67, but such manipulation is undesirable because the pads are apt to close at the wrong time and damage or misplace the film upon the teeth of the sprocket.

According to the present invention a positive lock of the pads is effected as follows. Assuming that a strip of film is to be removed from the sprocket 60, it is merely necessary to drop the lever 63 and pads 62 away from the sprocket 60. This movement of the lever 63 causes the spindle 64 to rotate with the ratchet 69 until the pawl 70 rides over the tooth and drops into the recess under tension of its spring 77. Reverse movement of the parts thus effected is prevented, while the operator manipulates the film. It will be clear that as the nose of the arm 71 of the pawl 70 dropped to engage the tooth of the ratchet 69 the button 73 of the opposite arm 72 moved upwardly in the slot 74. The button 73, as described, is accessible from the reverse side of the partition 11, i. e. in the A compartment in which the film C is contained. Therefore, when the proper threading of the film has been completed the operator merely depresses the button 73 to release the pawl from the ratchet 69, which with the spindle 64, lever 63 will swing upwardly to again bring the pads 62 against the film on the sprocket 60.

In the present arrangement, two additional sprocket drum units are used, one thereof designated E being disposed just below and at the delivery point of the framing device 34, and the third or last unit F in the train being arranged slightly forward and on a trifle lower elevation on the plate 13. The film C is delivered from the third sprocket unit F to the take up reel 55. The detail mechanism of each unit is substantially the same and it is believed the description of the D unit will suffice for the other units which are denoted in the drawing by corresponding reference numerals. It will be clear that such changes in the shapes of the parts are merely for the purpose of accommodating them to their respective position in the general arrangement.

A suitable power transmission is shown particularly in Figs. 1, 3 and 4, in which 82 denotes a square projection of the spindle 64 of unit F, the projection being adapted to receive a hand crank 82 at the exterior of the casing 10. The projection of the same spindle 60' of the cylinder 60 in the compartment B carries a large spur gear 83 meshing wih a spur pinion 84 keyed to a counter shaft 85 which is mounted in a bearing 86 and provided with a bevel gear 87 in mesh with the bevel gear 32 of the cut-off shutter shaft 25. A second spur pinion 88, keyed to a spindle 89 and operating a Geneva movement 90 for imparting an intermittent movement to the sprocket of unit E, is in mesh with the spur gear 83, the pinion 88 being substantially wider than the gear 83 to mesh with a second large spur gear 91 keyed to spindle 60' of unit D. Rotary motion is imparted to the take up reel 55 by means of a pulley 92 keyed to the hand crank spindle 60'; pulley 93 turning with the reel 55, and a belt 94 operating over the two pulleys. A take up idler pulley 95 for the belt 94 is carried at the free end of a lever 96, which is pivotally mounted on a screw pivot 97, and to the opposite end of which is attached one end of a helical spring 98, the other end thereof being fixed to a screw pin 99 eccentrically mounted in an adjustable cylinder 99' in the partition 11.

Referring now to the construction of the reels 53 and 55 and particularly to Figs. 11 and 12, 100 denotes the parallel circular discs or flanges which are preferably perforated for the purpose of reducing the weight. An annular member or core 101 separates the two discs 100 and comprises a curved piece of sheet metal having an inward radial projection 102 extending to a point short of the hub 103 of the reel proper. The opposite end of the curved piece of metal approaches the upper portion of the radial projection 102 to a point just short of making contact and is curved slightly inwardly to provide a lip 104. The end of the film is inserted in the opening between the parts 102 and 104 and is then engaged by a gripping device, comprising a pair of ears 105 with openings to receive the hub 103 said ears being internal parts of an angular plate 106 having a straight portion 107 disposed parallel to the projection 102, and a finger plate 108 projecting at right angles to the plane of the straight portion. The end of the finger plate projects to a point short of the inner periphery of the core 101 and at an elevation just over the stop lip 109 which is bent inwardly from the core. The other end of the portion 107 is bent over one half a complete circle and the free end projects inwardly and radially and is disposed closely adjacent the projection 102. A curved spring 110 is attached at one end to the portion 107 and at the other end it yieldably engages against inner periphery of the core.

To attach a strip of film to the reel, the end of the strip is inserted between the projection 102 and adjacent surface of the part 107, which is yieldably held against the film by the spring 110. As the reel is rotated in the usual manner the film coils about the core 101, the frictional engagement of the two parts 102 and 107 being sufficient to prevent the interposed film from escaping. When the film is being unwound from one reel and the last coil is reached, there is a point at which the radius described by the engaged end of the film will coincide with a line tangent to the periphery of the film on the other reel, whereupon the end of the film will be readily released from the first reel.

The operation of the several elements of my invention has been described in detail in connection with the description of the elements themselves, and it is not believed to be necessary to repeat the foregoing descriptions.

What I claim and desire to secure by Letters Patent is:

1. In a motion picture projecting apparatus, the combination with a film sprocket, of means for yieldably clamping the film against said sprocket, comprising pads movable into position against the film, a pivoted lever supporting said pads, and a ratchet and pawl arrangement associated with said lever for locking the latter in position to separate the pads from the adjacent surface of the film sprocket.

2. A locking arrangement for the film sprocket pads, as claimed in claim 1, in which said lever is keyed to a shaft having a single toothed ratchet wheel keyed thereto, and a pawl adjustable into and out of engagement with the tooth of said ratchet, said pawl being provided with a projection to facilitate operation thereof to release the ratchet wheel.

3. In a motion picture projection apparatus, the combination with a supporting surface, of film operating means disposed on one side of said surface and power transmitting means on the other side thereof, said film operating means comprising a sprocket to receive and control the movement of the film, lever actuated pads to yieldably hold the latter against the film about the sprocket, and means for moving and locking the pads in separated position from the sprocket including a ratchet and pawl device, and means controlled from the film side of said supporting surface to disengage the pawl from the ratchet to release the lock.

4. A locking device for film sprocket pads, as claimed in claim 3, including means for limiting the rotary movement of the ratchet in one direction to limit the possible movement of the lever actuated pads toward the sprocket.

In testimony whereof I affix my signature.

HENRY W. JOY.